C. STEENSTRUP.
SHAFT PACKING.
APPLICATION FILED NOV. 7, 1919.

1,382,941.

Patented June 28, 1921.

Inventor,
Christian Steenstrup,
by Albert G. Davis
His Attorney.

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

SHAFT-PACKING.

1,382,941.  Specification of Letters Patent.  Patented June 28, 1921.

Application filed November 7, 1919. Serial No. 336,405.

*To all whom it may concern:*

Be it known that I, CHRISTIAN STEENSTRUP, a citizen of the United States, residing at Schenectady, in the county of Schenectady, State of New York, have invented certain new and useful Improvements in Shaft-Packings, of which the following is a specification.

The present invention relates to packings of the labyrinth type comprising a plurality of axially extending interleaving rings, some of which carry radially extending annular projections which pack against the surface of adjacent rings thereby forming a tortuous passage to baffle the flow of the fluid, the leakage of which it is desired to prevent.

The object of my invention is to provide an improved method for making a packing element for use in a packing of the above-referred to type, and for a consideration of what I believe to be novel and my invention, attention is directed to the accompanying description and the claims appended thereto.

Figure 1:
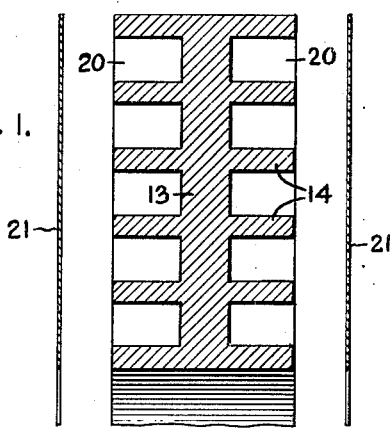
Figure 2:
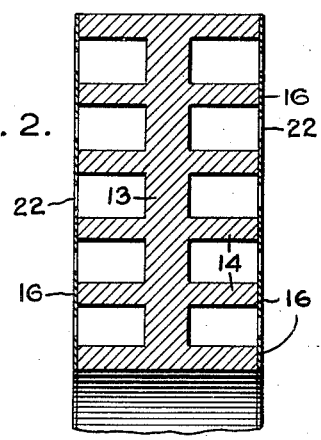
Figure 3:
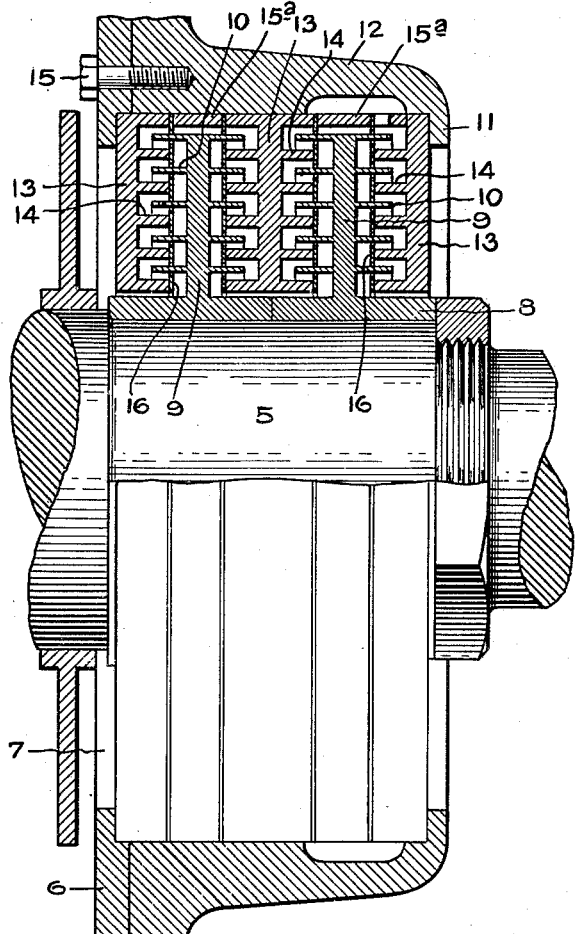

In the drawing, Figures 1 and 2 are views illustrating successive steps in the formation of a packing element, and Fig. 3 shows a complete packing made according to my invention.

Referring first to Fig. 3, 5 indicates a rotating shaft which may be, for example, the shaft of an elastic fluid turbine and 6 indicates a wall having an opening 7 through which the shaft projects and between which and the shaft it is desired to prevent leakage. Wall 6 may be, for example, a part of a turbine casing. Carried by shaft 5 are one or more sleeves 8 having axially spaced collars 9 thereon from which project concentric radially spaced axially extending rings 10.

Clamped between casing wall 6 and an inturned flange 11 on the outer end of a housing 12 are a number of packing elements each comprising a disk 13 located in a plane at right angles to the shaft and provided on either one or both sides with axially projecting concentric rings 14 which interleave with rings 10. Housing 12 is fastened to wall 6 by suitable bolts 15 and disks 13 are spaced apart by the outermost rings 14, between which are arranged spacing rings 15ª. Connected to the outer edges of rings 14 and projecting on each side thereof are thin packing strips 16. The edges of strips 16 terminate close to the surfaces of rings 10 and pack against them. Strips 16 are made from very thin material and present sharp edges to the surfaces of rings 10.

A packing as described above and shown in Fig. 3 is of known type and my invention has to do particularly with the method of making the packing elements which comprise the concentric rings 14 with the strips 16 projecting from the edges thereof. In this connection it is pointed out that such strips are made of very thin material and it is essential that they be accurately concentric and that they be very firmly attached to the edges of rings 14.

According to my invention I take a suitable piece of stock in the form of a disk (Fig. 1) and cut annular slots or grooves 20 in either one or both of its faces to form the projecting, concentric, radially spaced rings 14 carried by disk 13. If there are to be rings 14 on both sides of disk 13 then grooves 20 are cut on both sides as shown in Fig. 1. If however, there are to be rings 14 on only one side then grooves 20 are cut on only one side. It will be clear that grooves 20 can be all machined with a single setting of the piece of stock and that the rings 14 will be accurately spaced and perfectly concentric.

After grooves 20 have been cut, I then take a disk 21 of suitable material, such as nickel, place it against the outer edges of rings 14 and fasten it thereto in a suitable manner as by copper brazing. Disk 21 is of very thin material but being in the form of a disk it is readily handled without bending. In a case as shown in Fig. 1, a disk 21 will be fastened on each side of the packing element. Annular grooves 22 are now machined in the disks 21, such grooves being located between rings 14. This forms, as will be clear from Fig. 2, a packing element comprising the rings 14 on the edges of which are thin strips 16 projecting at right angles thereto, and each thin strip is fastened in place by brazing. Grooves 22 are made of such width that when the packing is assembled rings 10 will just pass through them and make the desired clearance therewith. Since the grooves 22 will be all cut at one setting of the packing element in the machine with which the work is performed they will be very accurately concentric and their edges will pack evenly against the surfaces of rings 10.

With my arrangement the strips may be as thin as found desirable and they may be made from a suitable non-corrosive metal as nickel or the like, while the part which carries them may be made of steel. Also the strips will be very firmly anchored to the edges of rings 14. Furthermore it will be clear that even though rings 14 should not be truly concentric, this will not affect the accuracy of the strips 16 since openings 22 are made after the strip 21 is fastened to rings 14.

What I claim as new, and desire to secure by Letters Patent of the United States, is:

1. The method of making a packing element which comprises taking a member having spaced projecting concentric rings thereon, fastening a sheet of thin material to the edges of said rings, and machining annular grooves in said sheet at points between said rings.

2. The method of making a packing element which comprises taking a member having spaced projecting concentric rings thereon, brazing a sheet of thin material to the edges of said rings, and machining annular grooves in said sheet at points between said rings.

3. The method of making a packing element which comprises taking a disk and machining spaced grooves in a surface of it to form spaced concentric rings, brazing a disk of thin material to the edges of said rings, and machining annular grooves in said disk at points between said rings.

4. The method of making a packing element which comprises taking a block of material, forming spaced annular concentric grooves in both side surfaces thereof to form concentric rings, brazing sheets of thin material over the edges of said rings, and forming annular grooves in said sheets at points between said rings.

In witness whereof, I have hereunto set my hand this 6th day of November, 1919.

CHRISTIAN STEENSTRUP.